United States Patent [19]
Crabb et al.

[11] Patent Number: 5,815,269
[45] Date of Patent: Sep. 29, 1998

[54] ROTATION SENSOR

[76] Inventors: Thomas M. Crabb, 6714 Shamrock Glen Cir., Middleton, Wis. 53562; Robert C. Richter, W9302 Red Feather Dr., Cambridge, Wis. 53523; William L. Phillips, 5337 Century Ave., Middleton, Wis. 53562

[21] Appl. No.: 761,032

[22] Filed: Dec. 5, 1996

Related U.S. Application Data

[60] Provisional application No. 60/008,268 Dec. 6. 1995.
[51] Int. Cl.⁶ .................................................. G01B 11/27
[52] U.S. Cl. ........................... 356/364; 356/138; 356/153
[58] Field of Search ..................................... 356/364–369, 356/153, 138, 373, 375; 250/225

[56] References Cited

U.S. PATENT DOCUMENTS

| | | | |
|---|---|---|---|
| 4,560,272 | 12/1985 | Harris | 356/364 |
| 4,948,255 | 8/1990 | Watanabe | 356/367 |
| 5,424,535 | 6/1995 | Albion et al. | 250/225 |
| 5,596,403 | 1/1997 | Schiff et al. | 356/153 |

*Primary Examiner*—Hoa Q. Pham

[57] ABSTRACT

A rotation sensor for measuring relative rotation or angular orientation between first and second members utilizing polarized light techniques. The present invention also relates to a method for measuring angular orientation using light polarization techniques.

15 Claims, 3 Drawing Sheets

ROTATION SENSOR

This application claims the benefit of Provisional application Ser. No. 60/008,268 filed Dec. 6, 1995.

BACKGROUND OF THE INVENTION

1. Field of the Invention

The present invention relates generally to a rotation sensor for measuring or detecting rotation or angular orientation between first and second or two or more members. More specifically, the present invention relates to a rotation sensor utilizing polarized light. The present invention also relates to a method for sensing the rotation or angular orientation of a first member both absolutely and relative to a second member.

2. Description of the Prior Art

A variety of rotation sensors are currently available in the art for sensing or measuring relative rotation of a rotatable member. One such rotation sensor is an optical encoder. In such a rotation sensor, a matched light source and a photodetector are provided on the opposite sides of a disk. The disk is attached to a shaft which is in turn mechanically coupled to the device whose rotation is to be measured. The disk is provided with a plurality of apertures which vary in radial position as the disk rotates, enabling light to pass through only at certain radii corresponding to its degree of rotation. Optical encoders are commonly available to provide absolute or incremental angle measurement. Although optical encoder rotation sensors function satisfactorily for certain applications, their use in many applications is limited because of size and weight limitations. They are also sensitive to electromagnetic interference (EMI).

Rotation sensors utilizing electrical resolver technology continue to be used in some aircraft applications. Electrical resolvers rely on mutual induction of electrical coils to convey the rotational position. Rotation sensors using this technology are generally quite massive, are usually less accurate and more expensive than sensors using optical encoders, and are also sensitive to EMI.

Resistive potentiometers are also used in some rotation sensors. The principal limitation of this type of rotation sensor is the limited number of cycles per lifetime, particularly with small sensors. Further, the output of the potentiometer, in most applications, requires shielding. Although normally smaller in size than an optical encoder sensors, they are often less desirable for small volume, critical applications because of unreliability and reduced precision. A further major drawback to potentiometer based sensors, like the others described above, is that the signal is conveyed via a sire; therefore, they are not immune to electromagnetic interference (EMI).

Hall effect rotation sensors involving the rotation or movement of a magnet past a detector are also available. However, they likewise suffer from the limitation of not being immune to EMI.

Accordingly, there is a need in the art for a rotation sensor which is small, lightweight, immune to EMI and is accurate and reliable.

SUMMARY OF THE INVENTION

In contrast in the prior art, the present invention provides a rotation sensor which is small, lightweight, immune to EMI and which is extremely accurate and reliable. The technology utilized in the rotation sensor apparatus and method of the present invention is light polarization technology. In the present invention, polarized light is used to measure the angle of rotation or angular orientation of one element or member relative to another. In accordance with the present invention, light intensity of linearly polarized light traveling through a linear polarizer will vary with the angle between the polarization vectors. This intensity signal can be converted to an electrical signal and a transformation or calibration file established for determining angular orientation.

In one embodiment of the present invention, linearly polarized light from a first member is transmitted to the light receiving side of a linear light polarizer which is rotatable relative to the first member. By measuring the intensity of the modulated light emitted from the light exiting side of the polarizer, the degree of rotation or angular orientation of the polarizer, or the member connected to it, can be determined. Preferably, the means for detecting or measuring the light intensity comprises a means which converts the modulated light into an electrical signal. Multiple linear polarizers may be used in parallel to increase the accuracy of the rotation sensor over a greater range of rotation.

A further embodiment involves a sensor in which a plurality of angularly positioned linearly polarized light sources are sequentially pulsed and reflected off a rotatable mirrored surface covered with a polarization film. The pulsed, modulated light signals are received by a light intensity sensor and converted to an electrical signal for processing. In this embodiment, the light intensity of the modulated light signals will vary with the rotational position of the rotatable mirrored surface relative to the light sources.

A still further embodiment utilizes linear polarizing light techniques, but instead of utilizing a constant or pulsed source of polarized light for a quantative measurement, utilizes a time varying polarization vector or light source. In this embodiment, a polarized light source is provided in which the polarization vector is rotated at a controlled, known rate. When a second linear polarizer is used to modulate the rotating polarized light source, a fluctuating light intensity signal is emitted which has a frequency twice that of the frequency of the rotating linearly polarized light source. As the second linear polarizer rotates, a phase shift occurs in the light intensity signal. By passing the rotating linearly polarized light source through a stationary reference linear polarizer, a phase shift between the outputs from the second linear polarizer and the stationary reference linear polarizer can be measured. The size of this phase shift varies with the relative rotation of the second polarizer. Thus, by establishing a calibration file of phase shifts for known angular positions, and measuring the phase shift, the angular orientation of the linear polarizer can be accurately determined.

The present invention also relates to a method of measuring rotation of a first member relative to a second member. One aspect of the method includes providing a polarized light source associated with a first member, providing a linear light polarizer on a second member, transmitting the polarized light from the polarized light source through the linear light polarizer to produce a modulated light signal and sensing the intensity or phase shift of the modulated light signal.

Accordingly, it is an object of the present invention to provide a rotation sensor which is lightweight, extremely accurate and has the capability of providing immunity to electromagnetic interference (EMI).

Another object of the present invention is to provide a rotation sensor which utilizes light polarization techniques.

A further object of the present invention is to provide a process for sensing and measuring rotation utilizing light polarization technology.

These and other objects of the present invention will become apparent with reference to the drawings, the description of the preferred embodiments and the appended claims.

DESCRIPTION OF THE PREFERRED EMBODIMENT AND METHOD

The present invention relates to a method and apparatus for measuring rotation or angular orientation of one member both absolutely and relative to another. Throughout the application the term "rotation" or "relative rotation" and the term "angular orientation" will be used. It is intended that these are one and the same. Thus, the rotation sensor of the present invention may also be referred to as a device for measuring angular orientation or relative angular orientation.

It is intended that the rotation sensor of the present invention can be used for any application where measurement of rotation or angular movement is desired. Possible applications include, among others, aircraft control positions, aircraft door and panel positions, aircraft and launch vehicle thrust control devices, spacecraft antenna and instrument pointing, biomedical and rehabilitation applications, tachometers, robotics, automobiles and consumer products applications.

Figure 1:
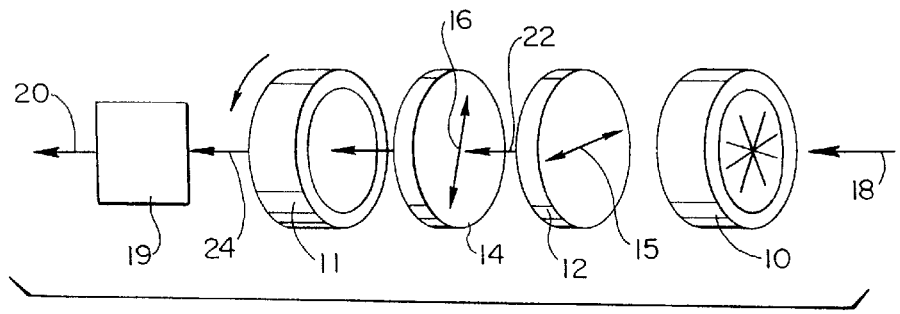
FIG. 1 illustrates a first embodiment of a rotation sensor in accordance with the present invention.

FIG. 1 illustrates a first embodiment of the present invention which measures or senses the relative rotation or angular orientation between a first member 10 and a second member 11. In the embodiment of FIG. 1, a first linear light polarizer 12 is mounted to or associated with the first member 10. The polarizer 12 includes conventional means for polarizing light in the direction of the vector 15. A second linear light polarizer 14 is connected or associated with the second member 11. The polarizer 14 is provided with means for polarizing light in the direction of the vector 16. A source of unpolarized light 18 provides unpolarized light to a light receiving side of the light polarizer 12. The light source 18 can be a local source closely adjacent to the member 10 and polarizer 12 such as a light emitting diode, or can be provided from a remote source via an optical cable such as a conventional fiber optic cable.

A light intensity sensor 19 is positioned adjacent to the light exiting side of the member 11 and polarizer 14. In the preferred embodiment, the light intensity sensor 19 is a conventional photodetector or photodiode for detecting and sensing light intensity and converting the light intensity signal to an electrical signal 20 which can be displayed or processed. If EMI immunity is desired, or if remote sensing is desired, a fiber optic cable or other light transmitting means may be provided between the polarizer 14 and the sensor 19.

During operation, the unpolarized light source 18, either from a local source such as an LED or a remote source via an optical cable, is provided to the light receiving side of the first light polarizer 12. This light exits the light emitting side of the polarizer 12 as polarized light 22. This polarized light 22 enters the second light polarizer 14 from the light receiving side and exits from the opposite, light emitting side as modulated light 24. The modulated light 24 is then exposed to the receiving end of the photodetector 19 which converts the light intensity signal into an electrical signal 20.

Because of light polarizing principals, it can be seen that the intensity of the modulated light 24 will vary with the angular orientation of the second polarizer 14 relative to the first polarizer 12. If the polarizing vectors 15 and 16 are oriented such that they are parallel to one another the modulated light 24 would exhibit full intensity. Thus, full intensity in the modulated signal 24 would correspond to a given angular orientation of member 11 relative to the member 10. If member 11 is rotated 90° relative to member 10 so that the polarizing light vectors 15 and 16 are perpendicular to one another, the intensity of the modulated light 24 will be at a minimum or zero. At other positions, the intensity of the modulated light 24 will vary between full intensity and zero intensity.

The electrical signal 20 from the photodetector 19 can be processed by technology known in the art so as to associate a particular electrical signal or voltage with a particular angular orientation of the member 11. For example, a calibration file can be established by measuring the particular voltage signal 20 at a particular known angular orientation of the member 11 and storing that in a calibration file. In the preferred embodiment, an optical encoder having in excess of 4,000 counts of per revolution was utilized to provide information regarding the specific angular orientation of the member 11. The specific voltage in each of these increments was stored in memory in the calibration file as being associated with that particular angular orientation. In this manner, the magnitude of the voltage signal 20 can be used to determine that exact angular orientation of the member 11.

Figure 9:
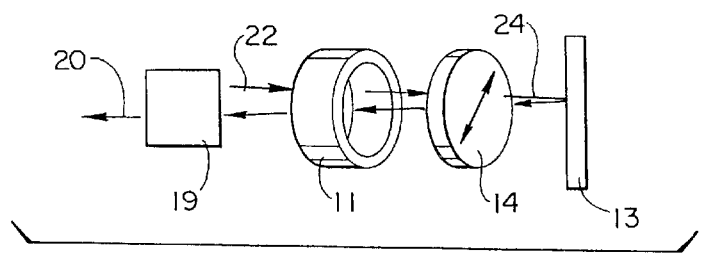
FIG. 9 is a modification of the embodiment of FIG. 1.

A modification of FIG. 1 is shown in FIG. 9 in which the polarized light source 22 is provided from the same side of the polarizer 14 as the detector 19. In this modification, polarized light 22 is modulated by the polarizer 14. This modulated light 24 is reflected off a mirror 13 or other reflective surface back through the polarizer 14 where the modulated light signal is received by the detector 19.

The embodiments of FIGS. 1 and 9 show the photodetector 19 being positioned immediately adjacent to the member 11 and only provides a detectable 90° of rotation. If desired, however, an optical cable can be utilized to transmit the modulated light signal 24 to the photodetector 19 at a remote location. A limitation of utilizing optical cable, however, is that light intensity being transmitted by a fiber optic cable will tend to fluctuate if the cable is bent or moved. The 90° and the fiber related limitations, however, can be overcome by utilizing multiple light polarizers and multiple fiber optic transmission cables as shown in the embodiment of FIG. 2.

Figure 2:
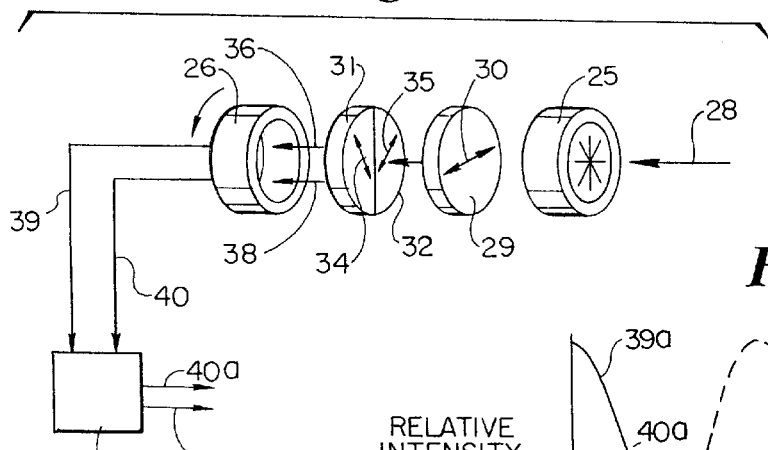
FIG. 2 illustrates a further embodiment of a rotation sensor in accordance with the present invention.

The embodiment of FIG. 2 includes first and second members 25 and 26 which are rotatable relative to one another, a source of unpolarized light 28 and a first linear light polarizer 29 attached to the first member 25. This polarizer 29 polarizes light in the direction of the vector 30. Associated and connected with the second member 26 are a pair of linear light polarizers 31 and 32 which polarize light in different directions shown by the vectors 34 and 35, respectively. With this embodiment, a pair of modulated light signals 36 and 38 are emitted from the polarizers 31 and 32, respectively. These signals 36 and 38 are transmitted by conventional fiber optic cables 39 and 40 to a photodetector 41 or a pair of photodetectors to produce a pair of electrical signals 39a and 40a.

Figure 3:
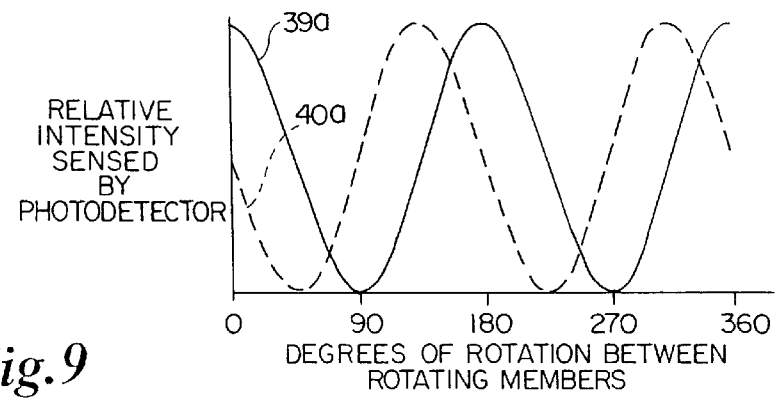
FIG. 3 is a graph showing sample output signals from the sensor of FIG. 2.

The signals 39a and 40a for a full 3600° rotation of the member 26 is shown in FIG. 3 which plots signal intensity against degree of rotation. While variations and fluctuations may occur in the signals 39a and 40a because of the transmission through the cables 39 and 40, such variations will be the same for both signals. Thus, the ratio of the two signals 39a and 40a will be independent of any variations resulting from the cable transmission. By known calibration techniques, such ratio can be associated with a particular angular orientation.

Figure 4:
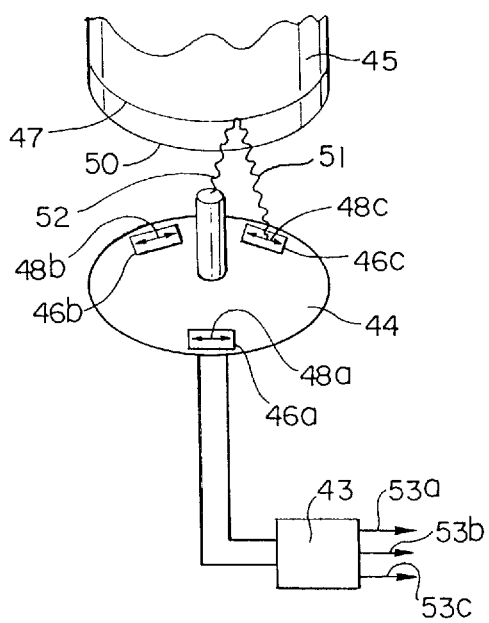
FIG. 4 illustrates a still further embodiment of a rotation sensor in accordance with the present invention.

A further embodiment is illustrated in FIG. 4. This embodiment includes a first member 44 and a second member 45 which are rotatable relative to one another. The first member 44 includes a plurality of polarized light sources 46a, 46b and 46c. In the preferred embodiment, these polarized light sources include three LED's covered with polarized film to produce polarized light in the direction of the vectors 48a, 48b and 48c, respectively. Thus, each of the LED's in combination with the polarization films produces a unique linear polarized light source. During operation, the three LEDs are pulsed sequentially by means known in the art. Thus, only one of the LEDs is on at any given time. The result is the generation of three sequentially pulsed polarized light sources. Positioned at the center of the member 44 is a fiber optic sensing or receiving cable 49. It should be noted that although the preferred embodiment shows three light sources, only one is needed to utilize the concept of this embodiment.

The second member 45 is provided with a mirrored surface 47 for reflecting light 51 from the polarized light sources. A linear light polarizer in the form of a polarization film 50 is provided adjacent to the mirrored surface 47 so that the polarized light 51 which is emitted by each of the light sources 46a, 46b and 46c is modulated by the polarization film 50. Because the film 50 covers the entire mirror surface 47, light 51 passes through the film 50 a first time where it is modulated and is then reflected off the surface 47. The modulated light 52 then passes through the film 50 a second time, after which it is detected by the fiber optic sensing cable 49. Although the polarized light 51 passes through the film 50 twice, the second pass does not further modulate the light in any significant way. The intensity or amplitude of the light signals received by the cable 49 is dependent on the particular light source which is activated, the orientation of the polarizing vector of that particular light source and the angular orientation of the member 45 and film 50 relative to the member 44. Rotation of the member 45 relative to the member 44 will alter the orientation of the polarization vectors of the polarizing films and thus change the intensity of the modulated light received by the fiber optic cable 49.

Similar to the embodiments discussed above, the fiber optic cable 49 is connected with a light intensity sensor 43 in the form of a photodetector for measuring the intensity of the three pulsed modulated signals 52a, 52b and 52c and converting them to corresponding electrical signals 53a, 53b and 53c respectively.

Figure 5:
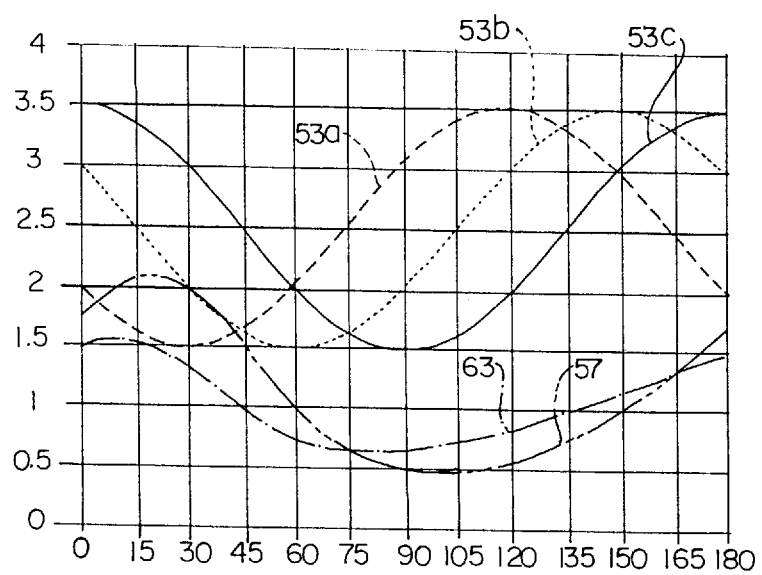
FIG. 5 is a graph showing sample output signals from the sensor of FIG. 4.

FIG. 5 is a graph reflecting the modulated light intensity resulting from each of the three LEDs after passing through the polarization film 50 and being reflected off the mirrored surface 47. FIG. 5 plots light intensity signal or voltage against angular orientation. Although each of the signals 53a, 53b and 53c is still periodic over 180°, with the three independent signals, it is possible to obtain two independent ratio curves 57 and 63 as shown in the lower half of FIG. 5, thus providing rotation sensing capability over 180°. Curve 63 is a ratio of signal 53b to 53a, while curve 57 is a ratio of signal 53c to 53a. The phase shift between the three signals 53a, 53b and 53c as shown in the upper half of FIG. 5 is due to the orientation of the polarization vectors 48a, 48b and 48c of the polarized light sources. Because all three signals share the same fiber optic cable 49, the ratio of two signals is independent of any modulated light intensity variations which could occur because of fiber optic bending losses or the like.

Figure 6:
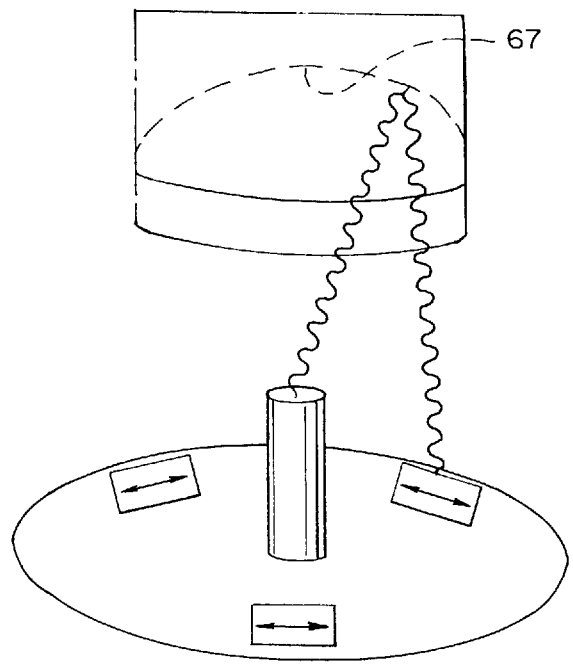
FIG. 6 illustrates a variation of the rotation sensor of FIG. 4.

A further modification of the embodiment of FIG. 4 is illustrated in FIG. 6. This embodiment is similar to that of FIG. 4 except that the mirrored surface 67 is a shaped or curved mirror. In this embodiment, it is important that the fiber optic cable 49 be precisely located at the focal point of the shaped mirror. In both of the embodiments of FIGS. 4 and 6, the photodetector could be positioned to receive the modulated light 52 directly, thereby eliminating the fiber optic cable 49.

The processing of the data and signals from the embodiment of FIG. 4 can be further summarized as follows. Light is transmitted, or presented to a photodetector 43, which converts the relative light intensity into a relative electrical signal. A varying intensity of light will then produce a varying electrical signal on the output of the photodetector 43. It is this electrical signal which is processed for termination of the angular position of the sensor.

The electrical signal produced from the photodetector 43 is a result of the light produced from a given light source on the sensor. The analog electrical signal is then digitized, and corresponded to the light source. This is a continuous process, in which the next sequential light source is turned on, thus producing another unique signal, which is then sampled and corresponded to that given light source The digital signal, which is provided by the means of an analog to digital converter, is then passed to the processing hardware in which the angle of the rotation sensor will be decoded. In the concept of the present invention, for a full 360 range of detection, three light sources are spaced about the light collector. In the preferred embodiment, these lights are spaced 120° radially from the light collection location. With each of the three light sources there is a corresponding digital representation of the intensity of light that is reflected back to the light sampling location. Two unique ratios are calculated from the three signals, namely, a ratio of one of the signals to a second and a ratio of a second signal to a third. The reason for utilizing the ratios is to neglect any effects of fiber optic cable modulating the light signal from the sensor. Because a fiber optic cable would induce the same effects on each of the signals, by taking the ratios of the signals, any modulation induced by the fiber is canceled. The two unique ratios are then used in a calibration method to determine the angle of rotation.

For each rotational sensor a calibration table, or equation is derived from testing. The calibration table contains the angle, in increments of desired rotational sensor accuracy, and the corresponding two ratios for that given sensor. Therefore, to calculate an angle of the sensor, the two unique ratios are compared with the table ratios, and by minimizing the error difference between measured ratios and calibration ratios, a corresponding angle of rotation is determined at the minimized error.

Each of the embodiments of FIGS. 1, 2, 4 and 6 is similar in that the measurement of the angular orientation of a member is determined by measuring or detecting the light intensity of a modulated light signal or the ratio or ratios of the light intensity of two modulated light signals. The embodiment of FIG. 7 differs in that it utilizes polarization phase modulation as the optical signal to be measured and processed. Thus, instead of detecting the light intensity signal for a quantitative measurement as in the above embodiments, the embodiment of FIG. 7 implements a phase shift in the modulated signal. As shown, this embodiment includes a source of unpolarized light 54 and a first member 55 and a second member 56 which are rotatable relative to one another. A linear light polarizer 58 is connected with the member 56 for rotation therewith.

This embodiment also includes a linear polarizer 59 having a polarization vector 60 which is rotated at a known angular velocity and a stationary linear light polarizer 61 to provide a referencing polarized light source. In the preferred embodiment, the polarizer 61 is positioned on the light receiving side of the rotating polarizer 59. A fiber optic cable 62 is provided between the member 56 and the rotating polarizer 59 to transmit the polarized light signal 64 from the polarizer 58. A second source of unpolarized light 67 is provided on the light receiving side of the linear polarizer 61. A light intensity detector 65 in the form of a photodetector is positioned on the light emitting side of the polarizer 59 for measuring the intensity of the modulated light signals.

Figure 7:
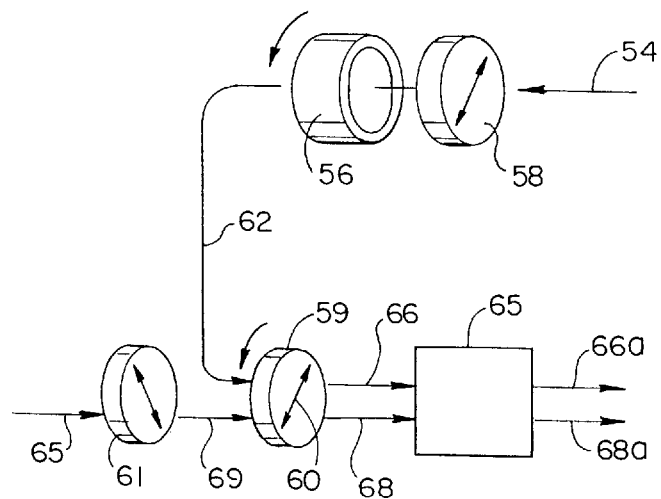
FIG. 7 illustrates a still further embodiment of a rotation sensor in accordance with the present invention.

The operation of the embodiment of FIG. 7 can be understood best as follows. Unpolarized light 54 is continuously transmitted to the light receiving side of the light polarizer 58. This may be local light from a source such as an LED or can be from a remote source provided through an optical cable. This light is polarized by the polarizer 58 and is emitted from the light emitting side of the polarizer 58 as polarized light 64. This polarized light 64 is then transmitted via the optical cable 62 or other means to the light receiving side of the rotating polarizer 59. The polarizer 59 modulates the polarized light signal 64 to produce the modulated signal 66. When converted to displayable form, this modulated signal appears as a sinusoidal curve such as that illustrated by curve 66a in FIG. 8.

Simultaneously, unpolarized light 67 is polarized by the referencing polarizer 61. This polarized light 69 is transmitted to the light receiving side of the same rotating polarizer 59 and is modulated to produce the modulated signal 68. This modulated light signal 68 also produces a curve of sinusoidal shape such as that illustrated by curve 68a in FIG. 8.

Figure 8:
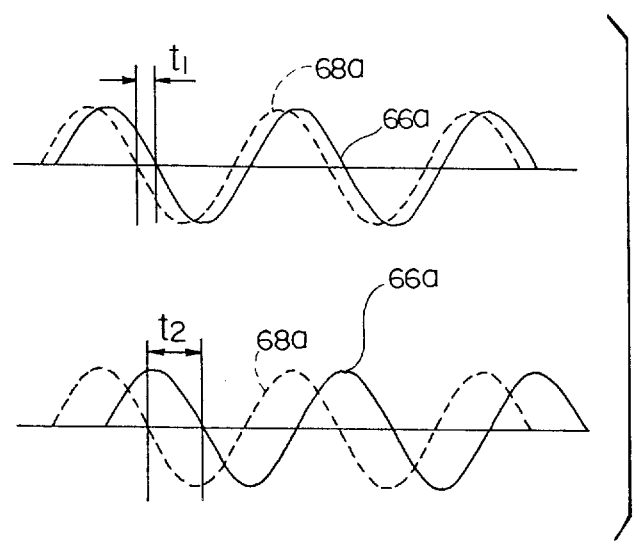
FIG. 8 is a graph showing sample output signals from the sensor of FIG. 7.

Because both modulated signals 66 and 68 are generated by the same rotating polarizer 59, the sinusoidal curves will have the same frequency which will be twice the rotational speed of the rotating polarizer 59. The phase shift between the two curves, however, will vary with the relative angular orientation of the polarizers 58 and 61. If these two polarizers are angularly positioned such that their polarization vectors transmitted to the polarizer 59 are parallel to one another, the two curves generated from the modulated signals 66 and 68 would in fact overlap. As the polarizers 58 and 61 rotate relative to one another, however, a phase shift between the curves begins to appear. In FIG. 8, the top half of the graph represents the phase shift of the two curves at an initial or reference position, while the bottom half of FIG. 8 reflects the phase shift between the two curves at a different angular orientation. By comparing the size of the phase shift between the initial and the relocated position, and comparing the same to the known angular position of the member 56, a calibration file can be generated. This enables the sensor to accurately measure angular orientation or degree of rotation by measuring the phase shift. By controlling the light source intensity synchronously with the rotating linear polarizer 59, this embodiment is able to provide absolute rotation sensing through a full 360°. Rotating polarizers such as faraday rotators can be used as the light source in this embodiment.

Although the description of the preferred embodiment has been quite specific, it contemplated that various modifications can be made without deviating from the spirit of the present invention. Accordingly, it is intended that the scope of the present invention be dictated by the appended claims rather than by the description of the preferred embodiment.

We claim:

1. A rotation sensor comprising:
    a plurality of linearly polarized light sources mounted to a first member and spaced from one another;
    a second member rotatable about an axis of rotation relative to said first member;
    a light reflecting surface with said second member;
    a common reflected light receiving member;
    a linear light polarizer rotatable with said second member between said light reflecting member and said common reflected light receiving member; and
    said plurality of linearly polarized light sources, said light reflecting surface and said common reflected light receiving member being positioned relative to one another such that light from said plurality of linearly polarized light sources is reflected from said light reflective surface and received by said common reflected light receiving member.

2. The rotation sensor of claim 1 wherein said common reflected light receiving member is mounted to said first member.

3. The rotation sensor of claim 1 wherein said plurality of linearly polarized light sources comprises at least three linearly polarized light sources.

4. The rotation sensor of claim 3 wherein said common reflected light receiving member is mounted to said first member.

5. The rotation sensor of claim 4 wherein said at least three linearly polarized light sources are spaced radially from and angularly about said common reflected light receiving member.

6. The rotation sensor of claim 5 including means for pulsing said plurality of linearly polarized light sources sequentially.

7. The rotation sensor of claim 1 including means for pulsing said plurality of linearly polarized light sources sequentially.

8. The rotation sensor of claim 1 wherein said common reflected light receiving member includes a single optical cable.

9. A method of sensing rotation of a first member relative to a second member, said method comprising the steps of:
    providing a plurality of pulsed polarized light sources on said first member;

providing a linear light polarizer on said second member;

providing a common light receiving member;

transmitting polarized light from said plurality of polarized light sources through said linear light polarizer to produce a plurality of pulsed modulated light signals, said plurality of polarized light sources and said light common receiving member being positioned relative to one another such that said plurality of pulsed modulated light signals is received by said common light receiving member; and sensing the intensity of said plurality of pulsed modulated light signals.

10. The method of claim 9 including determining the rotation of said member by measuring the amplitude of said plurality of pulsed modulated light signals.

11. The method of claim 9 including sensing the intensity of said plurality of pulsed modulated light signals with a single light intensity sensor.

12. The method of claim 11 including comparing said plurality of pulsed modulated light signals with one another.

13. The method of claim 9 wherein said plurality of pulsed polarized light sources comprise first, second and third polarized light sources to produce respective first, second and third respective modulated light signals.

14. The method of claim 13 including comparing the ratio of the intensity of said first and second modulated light signals with the intensity of said second and third modulated light signals.

15. The method of claim 9 including providing a light reflective surface on said second member whereby light from said plurality of light sources passes through said light polarizer and is reflected by said light reflective surface prior to the intensity of said plurality of modulated light signals being sensed.

\* \* \* \* \*

UNITED STATES PATENT AND TRADEMARK OFFICE
CERTIFICATE OF CORRECTION

PATENT NO. : 5,815,269
DATED : September 29, 1998
INVENTOR(S) : Thomas M. Crabb et al.

It is certified that error appears in the above-identified patent and that said Letters Patent is hereby corrected as shown below:

| Column | Line | Reads | Should Read |
|--------|------|-------|-------------|
| 5      | 14   | 3600° | 360°        |

Signed and Sealed this

Eighteenth Day of May, 1999

Attest:

Q. TODD DICKINSON

Attesting Officer

Acting Commissioner of Patents and Trademarks